(12) United States Patent
Levin et al.

(10) Patent No.: US 9,369,694 B2
(45) Date of Patent: Jun. 14, 2016

(54) ADJUSTING STEREO IMAGES

(71) Applicant: Lucasfilm Entertainment Company Ltd., San Francisco, CA (US)

(72) Inventors: John M. Levin, Mill Valley, CA (US); Brian Cantwell, Albany, CA (US); Ronald Mallet, Mill Valley, CA (US); Jeffrey Saltzman, San Francisco, CA (US)

(73) Assignee: LUCASFILM ENTERTAINMENT COMPANY LTD., San Francisco, CA (US)

(*) Notice: Subject to any disclaimer, the term of this patent is extended or adjusted under 35 U.S.C. 154(b) by 336 days.

(21) Appl. No.: 14/018,622

(22) Filed: Sep. 5, 2013

(65) Prior Publication Data

US 2014/0002452 A1    Jan. 2, 2014

Related U.S. Application Data

(63) Continuation of application No. 12/900,051, filed on Oct. 7, 2010, now Pat. No. 8,564,641.

(60) Provisional application No. 61/353,803, filed on Jun. 11, 2010.

(51) Int. Cl.
*H04N 13/00* (2006.01)
*G06T 17/00* (2006.01)
*H04N 13/02* (2006.01)
*G06T 7/00* (2006.01)

(52) U.S. Cl.
CPC .......... *H04N 13/0246* (2013.01); *G06T 7/002* (2013.01); *H04N 13/0011* (2013.01); *H04N 13/0018* (2013.01); *G06T 2207/30204* (2013.01)

(58) Field of Classification Search
CPC ............. H04N 13/0246; H04N 13/001; G06T 2207/30204
See application file for complete search history.

(56) References Cited

U.S. PATENT DOCUMENTS

| 5,714,997 | A * | 2/1998 | Anderson | H04N 19/27 348/36 |
| 7,933,512 | B2 * | 4/2011 | Campbell | H04N 13/0239 348/240.99 |
| 8,085,997 | B2 * | 12/2011 | Tanaka | G06K 9/00228 382/115 |
| 8,224,067 | B1 * | 7/2012 | Sayre | H04N 13/0022 345/419 |
| 8,228,327 | B2 * | 7/2012 | Hendrickson | H04N 13/0022 345/420 |
| 9,025,007 | B1 * | 5/2015 | Parsons | 345/419 |
| 2007/0146478 | A1 * | 6/2007 | Butler-Smith | H04N 5/262 348/47 |

(Continued)

OTHER PUBLICATIONS

Selected prosecution file history of U.S. Pat. No. 8,564,641 issued Oct. 22, 2013, inventor Levin, et al., 424 pages.

(Continued)

*Primary Examiner* — Dave Czekaj
*Assistant Examiner* — Tsion B Owens
(74) *Attorney, Agent, or Firm* — Kilpatrick Townsend & Stockton LLP (57) ABSTRACT

A computer-implemented method for adjusting stereo images includes receiving a video sequence associated with a recorded setting of a stereoscopic camera, the video sequence comprising pairs of left and right images. The method includes processing the pairs of left and right images to reduce influence of a discrepancy between the recorded setting and an actual configuration of the stereoscopic camera.

20 Claims, 5 Drawing Sheets

(56) References Cited

U.S. PATENT DOCUMENTS

2009/0237492 A1* 9/2009 Kikinis .............. H04N 13/0497
348/47
2012/0001907 A1* 1/2012 Wilkinson ......... H04N 13/0275
345/419

OTHER PUBLICATIONS

Masuji Suto, "StereoPhoto Maker (English)", Jun. 21, 2009, downloaded from the internet at: http://web.archive.org/web/20090621104628/http:/stereo.jpn.org/eng/stphmkr on Jun. 23, 2011, 6 pages.

Media Technology Intelligence: Nov. 2001, Downloaded from the internet at http://3dcinecast.blogspot.com/2008-11-01-archive.html on Jun. 11, 2010, 57 pages.

Quantel.com, "Quantel White Paper: Stereoscopic 3D Post Using the 3ality Digital 3flexTM SIP2100", downloaded from the internet at http://www.quantel.com/repository/files/whitepapers-sip2100november08.pdf on Jun. 23, 2011, Nov. 2008, 14 pages.

Sony Electronics, Inc. "Sony Stereo Image Processor Software MPES-3D01 User's Guide", 1st Edition (Revised 3), Software Version 1.20, 2009, downloaded from the internet at: http://ws.sel.sony.com/PIPWebServices/RetrievePublicAsset/StepID/MPES3D01-V1.20-UserGuide/original/MPES3D01-V1.20-UserGuide.pdf on Jun. 23, 2011, 116 pages.

The Foundry Visionmongers, Ltd "OCULA 2.2 User's Guide", 2011, downloaded from the Internet at: http://thefoundry.s3.amazonaws.com/products/ocula/nuke/documentation/Ocula-2.2v1-Nuke-User Guide.pdf on Jun. 23, 2011, 101 pages.

* cited by examiner

ADJUSTING STEREO IMAGES

CROSS-REFERENCES TO RELATED APPLICATIONS

This application claims priority to U.S. provisional patent application Ser. No. 61/353,803 filed Jun. 11, 2010 and entitled "Adjusting Stereo Images," and is a continuation of, and claims priority to, U.S. utility application 12/900,051 filed on Oct. 7, 2010 and entitled "Adjusting Stereo Images;" the entire contents of both are hereby incorporated herein by reference.

TECHNICAL FIELD

This document relates to adjusting stereo images.

BACKGROUND

Films can be produced by recording photographic images with cameras or by creating images using animation techniques or visual effects. For example, motion cameras can be used to record actor movement on a set. Motion cameras store images representing "snap-shots" of the recorded material at a specific point in time. When the images are presented rapidly in succession, the images can provide the appearance of continuous motion.

A camera's field of view ("FOV") is the (angular, linear, or areal) amount of the observable world that is seen by the camera at any given moment (e.g., when capturing an image in a frame). Objects outside of the camera's FOV during a given moment are not recorded in the image taken at that time.

Three-dimensional ("3D") images (stereo images) can be produced by taking left eye and right eye images with a camera. For example, a user can take a photo with a still frame camera by placing the camera's viewfinder in front of the user's left eye and another photo with the viewfinder in front of the user's right eye. The left and right images can be combined (e.g., on a computer) in order to create a 3D image.

SUMMARY

The invention relates to adjusting stereo images.

In a first aspect, a computer-implemented method for adjusting stereo images includes receiving a video sequence associated with a recorded setting of a stereoscopic camera, the video sequence comprising pairs of left and right images. The method includes processing the pairs of left and right images to reduce influence of a discrepancy between the recorded setting and an actual configuration of the stereoscopic camera.

Implementations can include any or all of the following features. The method further includes: including the left and right images in a virtual three-dimensional (3D) space; and generating a representative virtual camera rig in the virtual 3D space corresponding to the recorded setting; wherein the processing of the pairs of left and right images further comprises determining a new virtual camera rig for the virtual 3D space based on the pairs of left and right images, and generating modified pairs of left and right images using the new virtual camera rig. Determining the new virtual camera rig includes: assigning respective markers to the left and right images, each marker corresponding to one of multiple features in a physical scene depicted by the left and right images, each of the markers assigned based on at least one of: (i) user input indicating marker placement and (ii) matching analysis between separate images in the video sequence; and from each of the markers in the left and right images, generating a virtual light ray that passes through a corresponding nodal point in the representative virtual camera rig; wherein the new virtual camera rig is determined using the virtual light rays. Determining the new virtual camera rig further comprises: successively generating modified versions of the representative virtual camera rig, each of the modified versions having at least one aspect that differs from the recorded setting of the stereoscopic camera; evaluating each of the modified versions with regard to fit; and selecting one of the modified versions for the new virtual camera rig based on the evaluation. The matching analysis includes: performing a two-dimensional (2D) tracking on at least part of the video sequence using the markers; and calculating relative positions of the multiple features based on the 2D tracking; wherein successively generating the modified versions comprises positioning and animating the representative virtual camera rig. Positioning and animating the representative virtual camera rig comprises sequentially adjusting, in order: a tilt and roll of the representative virtual camera rig; a zoom of the representative virtual camera rig; a pan of the representative virtual camera rig; and a convergence distance of the representative virtual camera rig.

Determining the new virtual camera rig further comprises: defining at least one image plane in the virtual 3D space relative to the representative virtual camera rig and the left and right images; projecting the left and right images using the representative virtual camera rig onto the image plane to form respective left and right projected images; generating the new virtual camera rig in the virtual 3D space; capturing, using the new virtual camera rig, the left and right projected images from the image plane to form respective left and right modified images; and storing the left and right modified images. The method further includes: determining whether any of the left and right modified images is misaligned relative to the left and right images, respectively; and in case of misalignment, adjusting the new virtual camera rig. Adjusting the new virtual camera rig includes reducing the misalignment by at least one of (i) changing a rotation of left and right cameras of the new virtual camera rig, and (ii) increasing a zoom of the left and right cameras of the new virtual camera rig.

The influence of the discrepancy is reduced while preserving a convergence distance specified for the stereoscopic camera. Reducing the influence of the discrepancy comprises determining a movement of the stereoscopic camera in a session where the video sequence was captured. The method further includes determining the actual configuration of the stereoscopic camera based on the processing. The recorded setting includes values for the stereoscopic camera including: an interocular distance, a convergence distance, a focus distance, and left and right focal lengths. The method further includes smoothing at least some of the values to reduce quantization artifacts originating from analog-to-digital conversion. The method further includes adjusting the stereoscopic camera according to the processing. The adjustment is performed while the stereoscopic camera is at a physical scene where the left and right images were captured, and the method further includes again capturing the physical scene after the adjustment.

The method is performed at a camera manufacturing plant as a calibration or a quality control process.

In a second aspect, a computer program product is tangibly embodied in a computer-readable storage medium and includes instructions that when executed by a processor perform a method for adjusting stereo images. The method includes: receiving a video sequence associated with a recorded setting of a stereoscopic camera, the video sequence comprising pairs of left and right images; and processing the pairs of left and right images to reduce influence of a discrepancy between the recorded setting and an actual configuration of the stereoscopic camera.

In a third aspect, a system includes a virtual three-dimensional (3D) space implemented using a computer-readable storage device. The virtual 3D space includes a video sequence associated with a recorded setting of a stereoscopic camera. The video sequence includes pairs of left and right images. The system includes a solver implemented using a computer-readable storage device. The solver reduces influence of a discrepancy between the recorded setting and an actual configuration of the stereoscopic camera.

Implementations can include any or all of the following aspects. The system further includes a tracking module implemented using a computer-readable storage device, the tracking module assigning respective markers to the left and right images, each corresponding to a feature in a physical scene depicted by the left and right images. The system further includes a ray projecting module implemented using a computer-readable storage device, the ray tracing module generating, from each of the markers in the left and right images, a virtual light ray that passes through a corresponding nodal point in the representative virtual camera rig, wherein the new virtual camera rig is determined using the virtual light rays.

The system further includes an output device outputting the actual configuration of the stereoscopic camera based on the processing.

In a fourth aspect, a computer program product is tangibly embodied in a computer-readable storage medium and includes instructions that when executed by a processor perform a method for adjusting stereo images. The method includes receiving a video sequence associated with a recorded setting of a stereoscopic camera, the video sequence comprising pairs of left and right images. The method includes positioning each pair of left and right images in a virtual three-dimensional (3D) space according to the recorded camera setting. The method includes generating a representative virtual camera rig in the virtual 3D space corresponding to the recorded camera setting, the representative virtual camera rig comprising left and right cameras. The method includes assigning respective track markers to the left and right images, each of the track markers corresponding to one of multiple features in the physical scene. The method includes determining relative positions of the track markers in the video sequence. The method includes identifying, for each of the track markers and based on the relative positions, a point in the virtual 3D space relative to the representative virtual camera rig, each of the points reflecting a location of the corresponding feature in the physical scene. The method includes: from each of the track markers in the left and right images, generating a virtual light ray in the virtual 3D space that passes through respective left or right nodal point in the representative virtual camera rig. The method includes evaluating, for each of the pairs of left and right images, whether a fit between the virtual light rays and the points meets a closeness criterion. The method includes modifying, for each of the pairs and until the closeness criterion is met, at least one parameter of the recorded camera setting to generate a modified setting and evaluating the modified setting.

Implementations can provide any or all of the following advantages. Stereo images can be adjusted to reduce or eliminate influence of calibration errors or other discrepancies in camera equipment. A more user-comfortable 3D video can be created that complies with the filmmaker's convergence distance.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Some examples herein relate to "Matchmoving," a process by which a real-world set, camera, and camera movement are replicated within a computer. A matchmoving system can use a recorded video sequence to create geometry to represent the objects and/or environment from the video sequence and reproduce both the movement and optical parameters of the cameras that recorded the sequence. This can require the matchmoving system to "match-animate" a computer generated ("CG") stand-in for a live-action character in the recorded film. The resulting "camera matchmove" scene file can be used by artists, such as animators, technical directors, and compositors. For example, matchmove allows CG elements such as characters, vehicles, shadows, buildings, and particle effects (smoke, water, sandstorms, plants, etc.) to be rendered over (i.e., composited with) a sequence of scanned images (referred to as a background plate).

During recording of video sequences unintended errors can be introduced. Such errors can be caused by imperfections in the camera lens (e.g., when the optics of the lenses is not perfect), the mechanics of the camera or servos not being calibrated, or settings on the camera head mounts being off. For example, the frames can be recorded with a different tilt, pan and/or roll than what the settings on the equipment reflected. Such errors can lead to problems in the matchmoving process. As another example, the errors can cause viewer discomfort when the 3D video sequence is displayed.

In some implementations, processing can be performed that reduces or eliminates influence of equipment errors. For example, a system can receive a stereo video sequence that includes corresponding pairs of left and right images (e.g., frames) recorded by a stereoscopic camera (e.g., including a left and a right camera). The system can create a virtual 3D space for the video sequence. For example, a single pair of left and right images is placed in the virtual 3D space at a time. The system can analyze the left and right images and, in so doing, arrange a virtual stereo camera corresponding to the actual positions that the left and right cameras had when the video sequence was captured, as opposed to the settings shown on the camera equipment at that time.

The system can determine actual camera settings for the left and right cameras using the virtual 3D space and the virtual cameras. The determined actual camera settings can, for example, be compared to recorded settings for the left and right cameras (e.g., the desired settings for the cameras) to determine if there are discrepancies between the actual settings and the recorded settings (e.g., caused by errors). The settings can include, for example, and without limitation, an interocular distance between the two cameras (e.g., the left and the right camera in the stereoscopic camera), a convergence distance, a focus distance for each of the cameras, and/or left and right focal lengths.

In some implementations, the system can reduce and/or eliminate the discrepancies between the recorded settings and the actual camera settings. For example, the system can determine the actual camera settings by adjusting the tilt, roll, pan, and/or zoom of the virtual cameras in the virtual 3D space, and the actual settings can then be used in generating a 3D video from the sequence of left and right images.

In some implementations, the discrepancies between the recorded settings and the actual camera settings can be used to determine setting adjustments for the physical stereoscopic camera that recorded the video sequence. For example, a left and a right camera can record a shot at a physical scene. A system can receive a video sequence of the recorded shot and determine any discrepancies between the recorded settings and the actual camera settings if any exist. The physical stereoscopic camera can then be calibrated or otherwise adjusted to reduce discrepancies between the recorded settings and actual camera settings during later shots.

In another example, the capture of a shot and adjustment of the settings of the physical stereoscopic camera can be performed at a camera manufacturing plant as part of a calibration or a quality control process. That is, the correctness of the camera's settings mechanisms can be verified by checking that the camera actually produces stereo images according to its settings.

Figure 1:
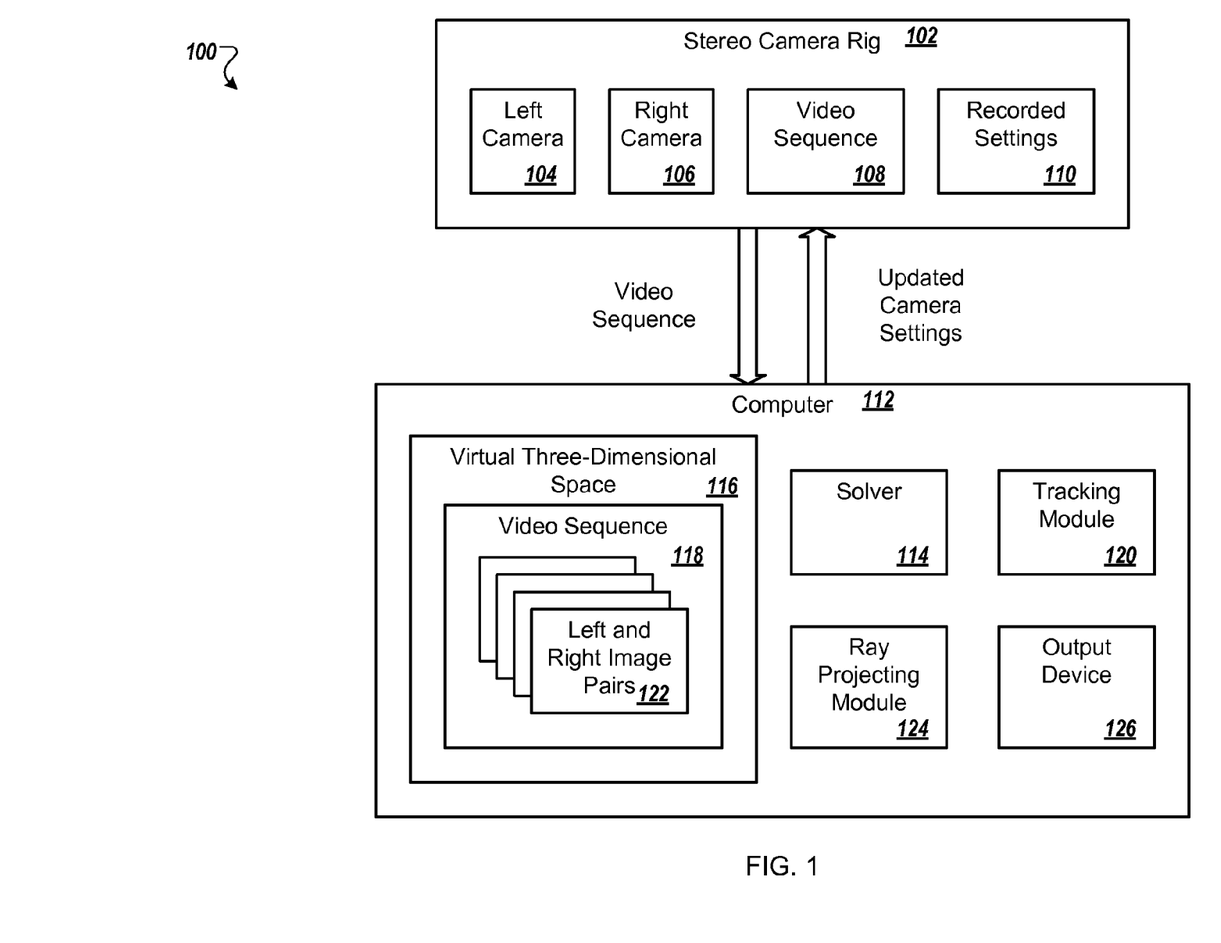
FIG. 1 is an example of a system for adjusting stereo images.

FIG. 1 is an example of a system 100 for adjusting stereo images. The system 100 can be used to generate a modified video sequence from an unmodified video sequence. In some implementations, the system 100 is used to update physical camera settings in order to reduce inaccuracies in the camera settings (e.g., caused by imperfections in the lens of the camera, the mechanics of the camera or servos not being perfectly calibrated, or settings on the camera head mounts being off).

The system 100 includes a stereoscopic camera rig 102. The stereoscopic camera rig 102 can be used to record 3D video sequences. For example, the stereoscopic camera rig 102 includes a left camera 104 and a right camera 106. The left camera 104 can record a video sequence intended to be viewed by the left eye of a viewer and the right camera 106 can record a video sequence intended to be viewed by the right eye of the viewer.

The left and the right video sequences can be combined to create a stereo video sequence 108. For example, the left and the right video sequences are stored in a single file. In some implementations, the left and the right video sequences are stored as separate files on the stereoscopic camera rig 102 and metadata associates the left and the right video sequences together in the stereo video sequence 108. The stereoscopic camera rig 102 can export or otherwise output the left and right images (e.g., separately or as a single file) as needed.

The stereo video sequence 108 is recorded using the stereoscopic camera rig 102 according to one or more recorded settings 110, in this example illustrated as recorded information stored on the stereoscopic camera rig 102. In some implementations, one or more of the recorded settings 110 is registered by manually reading the value(s) from the camera or other equipment.

In some implementations, the recorded settings 110 of the stereoscopic camera rig 102 can be stored in or associated with the video sequence 108. In some implementations, the recorded settings 110 of the stereoscopic camera rig 102 include a sequence of values. For example, if a focus distance of the stereoscopic camera rig 102 changes during recording of the video sequence 108, the recorded settings 110 can reflect the changed value.

The stereoscopic camera rig 102 can forward the stereo video sequence 108 to a computer 112. The stereoscopic camera rig 102 can transfer the stereo video sequence 108 to the computer 112 through a wired or a wireless connection. In some implementations, the stereo video sequence 108 is stored on a removable memory (e.g., a flash drive or a disk) and the removable memory is inserted into the computer 112. The computer 112 can store the stereo video sequence on a hard drive, a flash drive, or any other type of storage device.

In some implementations, the stereoscopic camera rig 102 and the computer 112 are positioned at the same location (e.g., the physical scene where the stereo video sequence 108 is recorded). In some implementations, the stereoscopic camera rig 102 and the computer 112 are at different locations. For example, the stereoscopic camera rig 102 can be at the physical scene where the stereo video sequence 108 is recorded and the computer 112 can be at an office.

A solver 114, here included on the computer 112, can analyze the stereo video sequence for one or more purposes. For example, the solver 114 can determine the actual settings of the stereoscopic camera rig 102. Examples of solving will be described below. In some implementations, the computer 112 provides updated camera settings from the solver 114 to the stereoscopic camera rig 102 to eliminate the discrepancies between the settings for later recordings of video sequences taken by the stereoscopic camera rig 102.

In some implementations, the solver 114 uses a virtual 3D space 116 to analyze one or more image frames from a stereo video sequence 118 (e.g., the stereo video sequence 108). An example of a virtual 3D space is described below with reference to FIG. 3.

A tracking module 120 can identify one or more features (e.g., pixel patterns or other image characteristics) in one or more left and right image pairs 122 from the stereo video sequence 118. In some implementations, the left and right image pairs 122 include non-sequential images from a subset of the frames in the stereo video sequence 118. For example, the left and right image pairs 122 can include every other frame for a subset of the frames from the stereo video sequence 118.

The tracking module 120 can assign markers to the features in the left and right image pairs 122. In some implementations, the markers assigned by the tracking module 120 are selected so that they correspond to features in the physical scene that are not moving in relationship to one another. In some implementations, the tracking module 120 identifies the same feature(s) across a sequence of left and right image pairs and places markers for the identified feature(s) on each of the left and right image pairs in the sequence. For example, a user can place markers on an initial frame to indicate the feature(s) to be tracked, and the tracking module 120 can recognize the same or similar pixel patterns in subsequent images so that corresponding tracking markers can be placed. In some implementations, the tracking module 120 stores the location of the track markers on the computer 112.

For example, for a single left and right image pair, the tracking module 120 can track features shown in both images. The solver 114 can calculate the relative positions of the tracked features appearing in the image pairs using the markers in the left and right image pairs. The calculated relative positions correspond to respective points in the virtual space reflecting positions of the various tracked features. Accordingly, when the relative positions have been calculated, the computer 112 can place a point in the virtual 3D space 116 for each feature tracked by the markers.

A ray projecting module 124 can project rays through virtual cameras in the virtual 3D space 116. The rays can be projected from the center of a tracking marker, through the corresponding virtual camera, and into the area of the virtual 3D space that contains the points for the relative locations of the tracked features. Particularly, a ray can be projected from each marker in the left image in a direction that depends on a nodal point of the left virtual camera. The ray projecting module 124 can generate rays for one or more of the markers associated with a single left and right image pair. The ray projecting module 124 can create rays for each of the left and right image pairs 122.

In some implementations, the projected rays can be considered as follows. When the image was created, the incoming light that pictured the feature on the image passed through the camera in a straight line toward the spot where the marker is now located. Accordingly, by projecting the light ray from the marker and "backwards" through the virtual camera, one learns the direction from where the incoming light originated, assuming that the virtual camera's position and other settings correspond to those actually used when the image was captured. Stated another way, by relocating and/or rearranging the virtual camera in the virtual 3D space, the projected light ray for any marker can be caused to assume one or more different directions. For example, one of those directions can pass through the corresponding point in the virtual 3D space for the marker.

The solver 114 can readjust the virtual cameras in the 3D virtual space so that the best possible fit is obtained between the light rays and the points. For example, the solver 114 positions the virtual cameras so that for each of the left and right image pairs 122, all of the rays intersect the points for their respective features. As another example, the solver 114 positions the virtual cameras so that the fit between the light rays and the points is as good as possible. In some implementations, the solver can perform an optimization that results in choosing the one camera position for which the light rays pass as closely as possible to the respective points. For example, a closeness criterion can be used to evaluate the candidate camera positions (e.g., such as to minimize the total distance by which light rays miss their points, or to minimize the corresponding squared values of such distances.)

The solver 114 arrives at a solution that specifies a location of the virtual cameras for each left and right image pair 122. The location of the virtual cameras corresponds to the actual location of the left camera 104 and the right camera 106 when the stereo video sequence 108 was recorded.

The computer 112 can use the settings of the virtual cameras as determined by the solver 114 to determine the actual settings of the stereoscopic camera rig 102 when the stereo video sequence 108 was recorded. For example, if the solver 114 arrives at a solution where the convergence distance of the virtual cameras is 25 ft., then this implies that the actual convergence distance of the stereo camera rig 102 was 25 ft. when the images were captured, regardless what convergence distance was registered at the location. Some implementations described herein produce 3D videos that have the filmmaker's chosen convergence distance, despite that the images were actually shot with a somewhat different convergence distance.

In some implementations, the computer 112 can create a new video sequence from the video sequence 118 where the left and right image pairs 122 are realigned. The solver 114 can use the virtual 3D space 116 to create the new video sequence, recording the FOV of the adjusted virtual cameras.

In some implementations, the virtual 3D space 116 is presented on an output device 126. For example, the first left and right image pair of the left and right image pairs 122 can be presented to a user on the output device 126. The computer 112 can receive input from the user that indicates which features in the first left and right image pair to track. The tracking module 120 can use the indicated features during placement of the track markers in the left and right image pairs 122.

In some implementations, the output device 126 can present a video sequence to a user. For example, the output device 126 can present the new video sequence to a user. In some implementations, the output device 126 presents updated settings for the stereoscopic camera rig 102 to a user. For example, the user can use the presented settings to manually adjust the settings of the stereoscopic camera rig 102.

Figure 2:
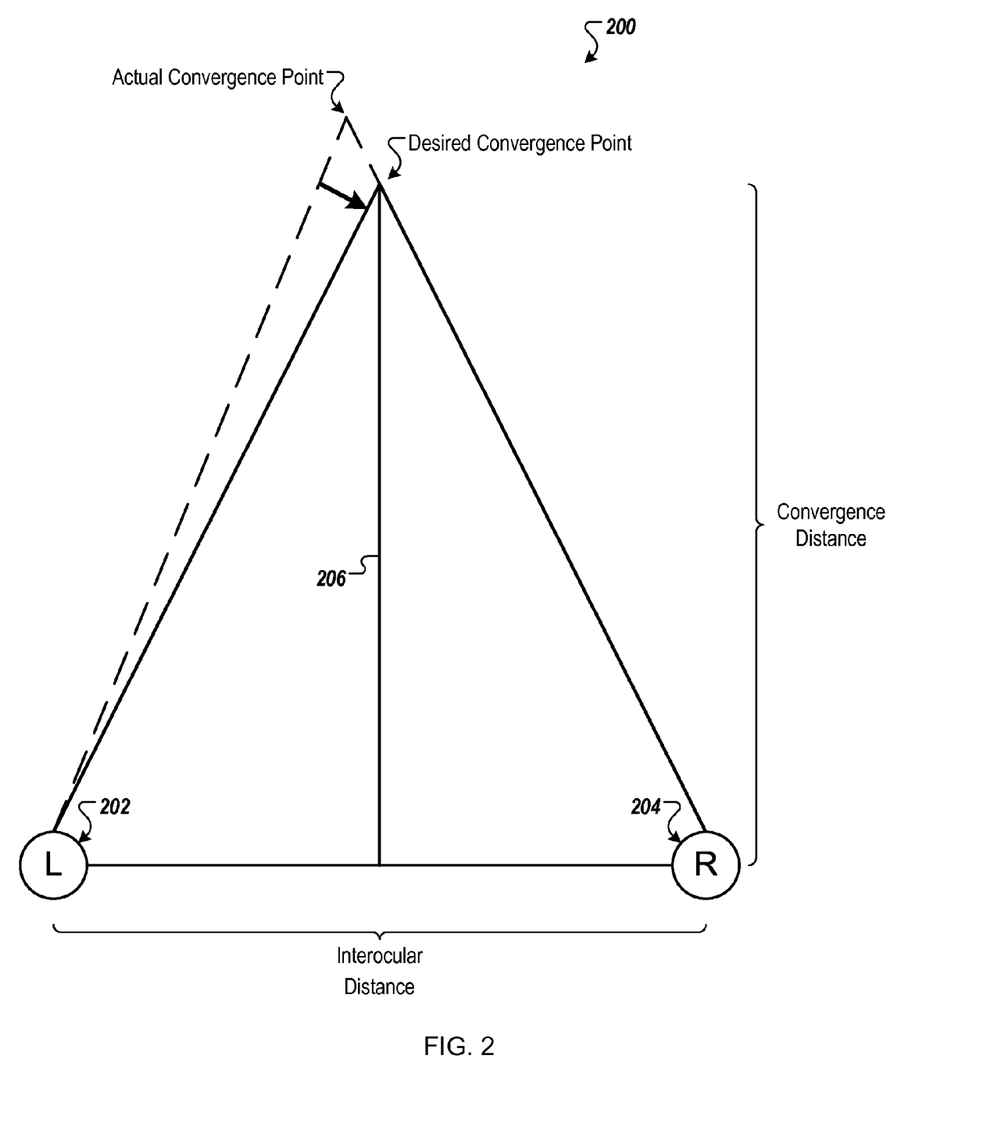
FIG. 2 is an example of a stereoscopic camera rig.

FIG. 2 is an example of a stereoscopic camera rig 200. The stereoscopic camera rig 200 can be the same as, or similar to, the stereoscopic camera rig 102. The stereoscopic camera rig 200 includes settings for recording a scene to create a stereo video sequence (e.g., the stereo video sequence 108).

The stereoscopic camera rig 200 includes a left camera 202 and a right camera 204. In some implementations, one of the cameras looks forward and the other camera looks downward at a beam splitter that is mounted to have the downward looking camera film the stereo sibling of the forward looking camera.

The left camera 202 and the right camera 204 can have the same FOV angles. For example, the video sequence recorded by the left camera 202 and the video sequence recorded by the right camera 204 can be symmetric about an imaginary plane 206 located halfway between the left camera 202 and the right camera 204. The left camera 202 and the right camera 204 can be angled towards the imaginary plane 206 converging at a desired convergence point according to recorded settings of the stereoscopic camera rig 200.

A solver (e.g., the solver 114) can determine the discrepancies between the actual settings of the stereoscopic camera rig 200 and the recorded settings. The solver can use the discrepancy values to determine updated settings for the stereoscopic camera rig 200.

In some implementations, the solver adjusts virtual cameras in a virtual 3D space in order to generate a new video sequence (e.g., as the recorded video sequence was intended to be recorded). For example, the solver can adjust the tilt, pan, roll, zoom, convergence distance, and/or interocular distance of the virtual cameras that correspond to the left camera 202 and the right camera 204.

Adjustment of the settings by the solver can allow the virtual left camera and the virtual right camera to converge at the desired convergence point instead of the actual convergence point. The adjusted left and right cameras can generate a modified video sequence (e.g., modified left and right images) using the adjusted settings in order to create a modified stereo video sequence. Viewing of the modified stereo video sequence can reduce eye strain compared to viewing of the originally captured stereo video sequence.

Figure 3:
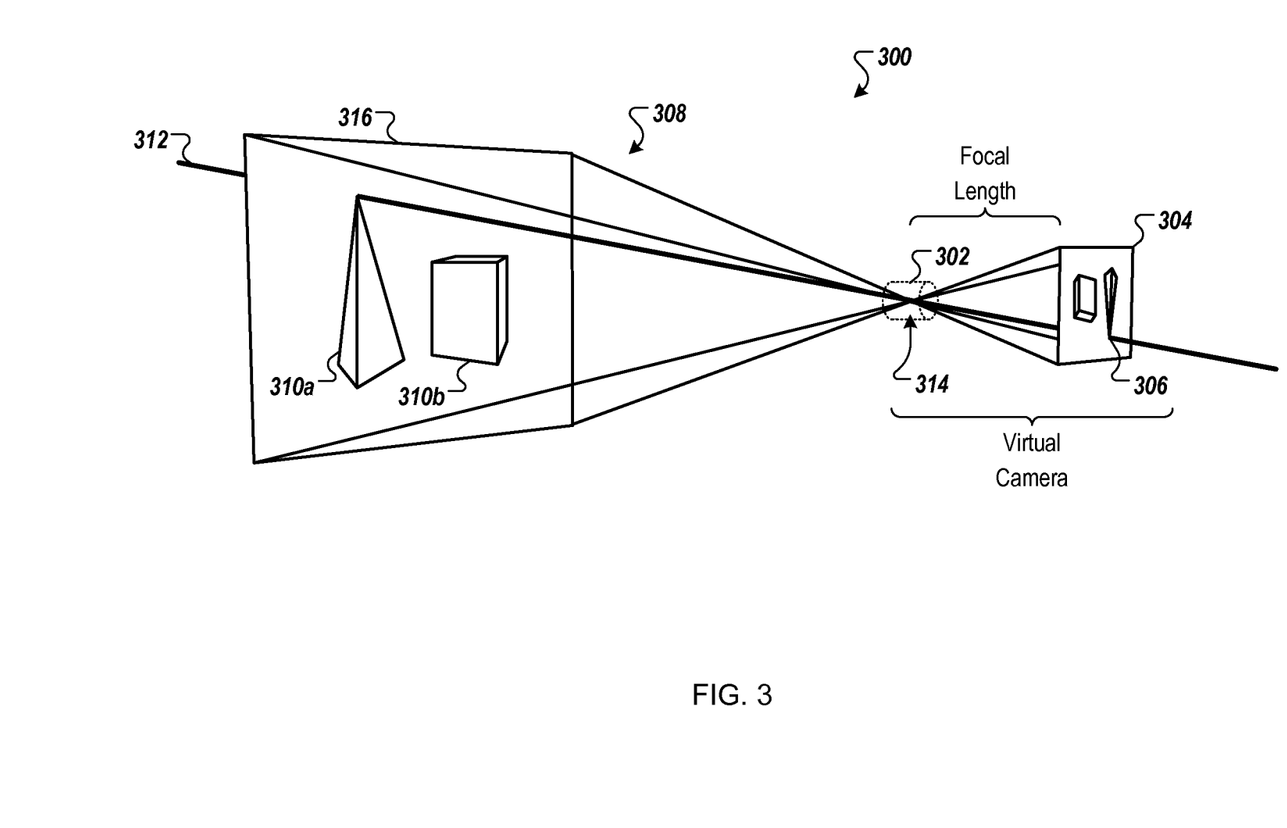
FIG. 3 is an example of a virtual three-dimensional space.

FIG. 3 is an example of a virtual three-dimensional space 300, for example the virtual 3D space 116 (FIG. 1). In the virtual 3D space 300 can be placed images recorded by a physical stereoscopic camera rig. The virtual 3D space 300 can be used to determine settings of the stereoscopic camera rig when the images were recorded. In some implementations, the virtual 3D space 300 can be used to determine updated settings for the physical stereoscopic camera rig.

The virtual 3D space 300 includes a virtual cameras, here schematically indicated by a lens 302. In some implementations, the virtual 3D space 300 includes two or more virtual cameras (e.g., a stereoscopic camera rig with left and right cameras). The virtual 3D space 300 can include a virtual representation of each of the cameras (e.g., two virtual cameras for a virtual stereoscopic camera rig).

An image-adjusting system (e.g., the system 100) can use recorded setting information of the physical stereoscopic camera during creation of the virtual stereoscopic camera rig. For example, the system can use the physical stereoscopic camera rig's interocular, convergence, and focus distances, and the focal lengths of the left and right lens during creation of the virtual stereoscopic camera rig in the virtual 3D space 300.

In some implementations, the recorded setting values can be smoothed in order to reduce quantization artifacts originating from analog-to-digital conversion. For example, the system can fit functions to the recorded setting values. The system can fit one function to the values for each of the separate settings (e.g., one function for the interocular distance and one function for the left focal length).

Each image in the sequence of images can be presented on a film plane 304 in the virtual 3D space 300. The film plane 304 can be considered part of the virtual camera 302 that represents the corresponding physical camera (e.g., the left or the right camera of the stereoscopic camera rig).

The system can place one or more track markers 306 on features in the images on the film plane 304. The system can determine which features to track based on pattern recognition (e.g., pixel patterns in the images). In some implementations, the system receives input from a user that indicates which features to track. In some implementations, the system records the position (e.g., the x and y coordinates) of the track markers 306 on a computer and does not visually present the track markers 306 on the film plane 304. In some implementations, the system can track a predetermined minimum number of features across the images in the sequence. Tracking of markers between the various images can be performed using any known tracking technique.

The system can use the track markers 306 to track selected features (e.g., image patterns) in the image sequence, and can register the corresponding x and y coordinates of the track markers 306 for the respective images. The system can use the tracking information to calculate the relative positions of the tracked features in 3D space. For example, the system can define a 3D area 308 in the virtual space. Here, objects 310a-b in the area 308 schematically represent shapes and locations of physical objects in relation to the plane 304. That is, the calculated relative locations of the physical features can be mapped in the area 308, for example using one point for each track marker. For illustrative purposes, the objects 310a-b are shown as solid virtual models and not merely as collections of points.

Any suitable matching technique can be used to match markers between images, including, but not limited to, correlation of the markers. In some implementations, the system can use a Fast Fourier Transformation and/or an optimization algorithm during matching of track markers from image to image in the image sequence. In some implementations, the system can use Fast Fourier Transformation and/or optimization algorithm during matching of track markers between the left and right images of an image pair.

The system tracks the same features in both the left and the right images from an image pair. The system can triangulate the position of the left and the right virtual cameras and find the same point in the 3D area 308 that corresponds to the two track markers associated with the feature in the left and right images.

The system can project a ray 312 through the center of one or more of the track markers 306. In some implementations, the system projects a ray for each of the track markers 306, in each of the images in the sequence. The system can then position and/or configure the virtual camera 302 for a best fit between the rays and the respective features in the 3D geometric models 310a-b.

In some implementations, the virtual camera 302 is positioned such that the rays intersect the features in the 3D geometric models 310a-b as closely as possible. The system can determine the movement of the virtual camera 302 based on the position of the virtual camera 302 across the sequence of images.

In some implementations, positioning of the virtual camera 302 creates an optimized virtual stereoscopic camera rig (e.g., when both a left and a right camera have been positioned). The optimized stereoscopic camera rig can be used by the system to determine the actual settings of the physical stereoscopic camera rig that recorded the video sequence.

The ray 312 passes through the nodal point 314 of the virtual camera 302. The distance between the nodal point 314 and the film plane 304 is the focal length of the virtual camera 302. The nodal point 314 and the four corners of the film plane 304 form a pyramid where the angles formed by the pyramid are the FOV angles of the virtual camera 302. The lines formed between each corner of the film plan 304 and the nodal point 314 can be extended into the 3D area 308, as illustrated here, to define the FOV of the virtual camera 302 in the 3D area 308.

In some implementations, the system can determine alignment errors between the left and right virtual cameras and reduce the error by sequentially adjusting the camera tilt (x-axis rotation) and roll (z-axis rotation), camera zoom, camera pan (y-axis rotation), and the camera interocular distance.

In some implementations, the system adjusts the settings of both the left and the right cameras. In some implementations, the system adjusts the settings of one of the two cameras. In some implementations, the system adjusts some settings on one of the cameras and some settings on the other camera.

The adjustment of the virtual camera settings by the system can create an optimized virtual stereoscopic camera rig. The optimized virtual stereoscopic camera rig can be used to determine errors in the tilt, roll, and zoom of the physical stereoscopic camera rig. The optimized virtual stereoscopic camera rig can be used to compute the actual interocular and convergence distances of the physical stereoscopic camera rig.

In some implementations, the system can correct misalignments (e.g., when the left and right images do not line up exactly) in the optimized stereoscopic camera rig by constraining a symmetrical, perfectly aligned stereoscopic camera rig ("corrected stereoscopic camera rig") to the optimized stereoscopic camera rig. The corrected stereoscopic camera rig can maintain the optimized cameras' positions and interocular distance. For example, the corrected stereoscopic camera rig can use the same nodal points as the optimized stereoscopic camera rig.

The convergence distance of the corrected stereoscopic camera rig can be adjusted (e.g., when the convergence distance of the optimized stereoscopic camera rig was not the desired convergence distance). The tilt, roll, and zoom of the corrected stereoscopic camera rig can be adjusted to correct misalignments between the actual settings of the physical stereoscopic camera rig and the recorded settings. In some implementations, the alignment errors can be corrected while preserving the convergence distance of the physical stereoscopic camera rig.

The original left and right images can be projected through the corrected stereoscopic camera rig. For example, here the projection is represented as an image plane 316 for one of the virtual cameras. The image planes 316 correspond to the respective projections from the from the corrected stereoscopic camera rig's left and right cameras. These projections can be stored as newly generated images.

In some situations, misalignment between the left and the right cameras can be visible around the edges of the corrected stereoscopic camera rig's image planes (e.g., where the physical recording of the left and right images in the sequence did not line up). For example, there can be gaps between the edges of the image planes for the left and the right cameras. The system can adjust the corrected stereoscopic camera rig's left and right cameras by rotating the cameras and adjusting the zoom (e.g., increasing the zoom) in order to change the FOV of the left and/or right cameras until the gaps are no longer visible between the two image planes.

In some implementations, the system can successively generate two or more optimized and/or corrected stereoscopic camera rigs such that each of the stereoscopic camera rigs has at least one aspect that differs from the recorded setting of the physical stereoscopic camera. The system can evaluate each of the stereoscopic camera rigs with regard to fit and select one of the stereoscopic camera rigs for the new virtual camera rig based on the evaluation.

Figure 4:
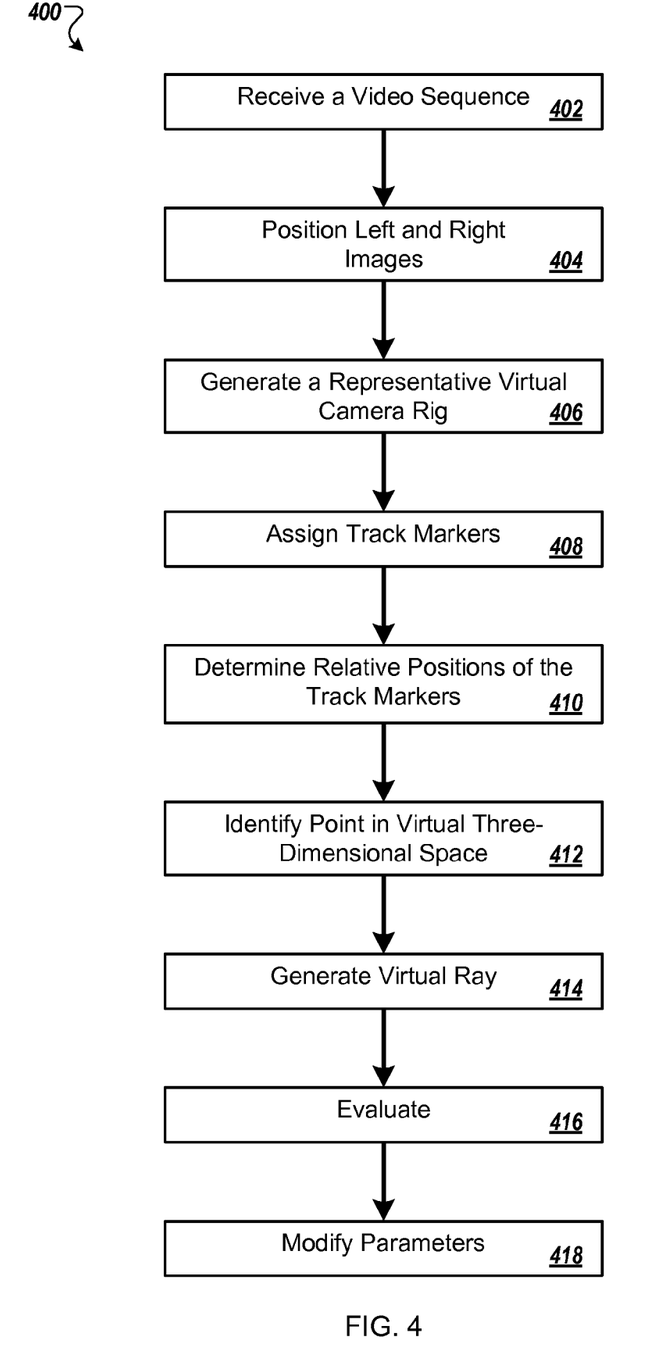
FIG. 4 is a flow chart of an example method that can be performed to adjust stereo images.

FIG. 4 is a flow chart of an example method 400 that can be performed to adjust stereo images. The system 100 and parts thereof will be referred to in the following as examples. The method 400 can be performed by one or more other systems in conjunction with or instead of the system 100. One or more steps of the method can be performed in a different order; as another example, more or fewer steps can be performed. The method 400 can be performed by a processor executing instructions stored in a computer program product.

Step 402 involves receiving a video sequence associated with a recorded setting of a stereoscopic camera. In some implementations, the video sequence includes pairs of left and right images. For example, the computer 112 can receive the video sequence 118 from the stereoscopic camera rig 102. The video sequence 118 can be associated with the one or more recorded settings 110.

Step 404 involves positioning each pair of left and right images in a 3D virtual space according to the recorded camera setting. For example, the computer 112 can position the left and right image pairs 122 in the virtual 3D space 116.

Step 406 involves generating a representative virtual camera rig in the virtual 3D space corresponding to the recorded camera setting. In some implementations, the representative virtual camera rig includes a left and a right camera. For example, the computer 112 can generate a virtual stereoscopic camera rig in the virtual 3D space 116. The virtual stereoscopic camera rig can include a virtual left camera and a virtual right camera (e.g., the stereoscopic camera rig 200).

Step 408 involves assigning respective track markers to the left and right images. In some implementations, each of the track markers corresponds to one of multiple features in the physical scene. For example, the tracking module 120 can place track markers (e.g., the track markers 306) on features (e.g., pixel patterns) in the left and right image pairs 122.

Step 410 involves determining relative positions of the track markers in the video sequence. For example, the tracking module 120 can determine the position of the track markers associated with a single feature across the left and right image pairs 122. In some implementations, the tracking module 120 fits a function to the values of the relative positions of the track markers associated with a single feature.

Step 412 involves identifying, for each of the track markers and based on the relative positions, a point in the virtual 3D space relative to the representative virtual camera rig. In some implementations, each of the points reflects a location of the corresponding feature in the physical scene. For example, the solver 114 can identify a point in the virtual 3D space 116 for each of the track markers. The point in the virtual 3D space 116 can be representative of the location of the feature relative to the physical stereoscopic camera rig that recorded the left and right image pairs 122.

Step 414 involves generating, from each of the track markers in the left and right images, a virtual light ray in the virtual 3D space that passes through respective left or right nodal point in the representative virtual camera rig. For example, the ray projecting module 124 can generate a ray (e.g., the ray 312) through a respective track marker.

Step 416 involves evaluating, for each of the pairs of left and right images, whether a fit between the virtual light rays and the points meets a closeness criterion. For example, the solver 114 can evaluate the fit between the generated rays and the associated points in the virtual 3D space 116. The solver 114 can determine if the set of generated rays is closer to the points than other possible sets of rays.

Step 418 involves modifying, for each of the pairs and until the closeness criterion is met, at least one parameter of the recorded camera setting to generate a modified setting and evaluating the modified setting. For example, the solver 114 can modify one or more settings of the virtual stereoscopic camera rig until the generated ray intersects the associated point in the virtual 3D space 116. In some implementations, the solver 114 sequentially modifies the camera tilt (x-axis rotation) and roll (z-axis rotation), camera zoom, camera pan (y-axis rotation), and the camera interocular distance.

The modified settings can be used to determine the actual settings of the physical stereoscopic camera rig. The modified setting can be used to determine updated settings for the physical stereoscopic camera rig. In some implementations, the modified settings are used to process the left and right image pairs 122 to reduce influence of a discrepancy between the recorded setting and an actual configuration of the physical stereoscopic camera rig.

Figure 5:
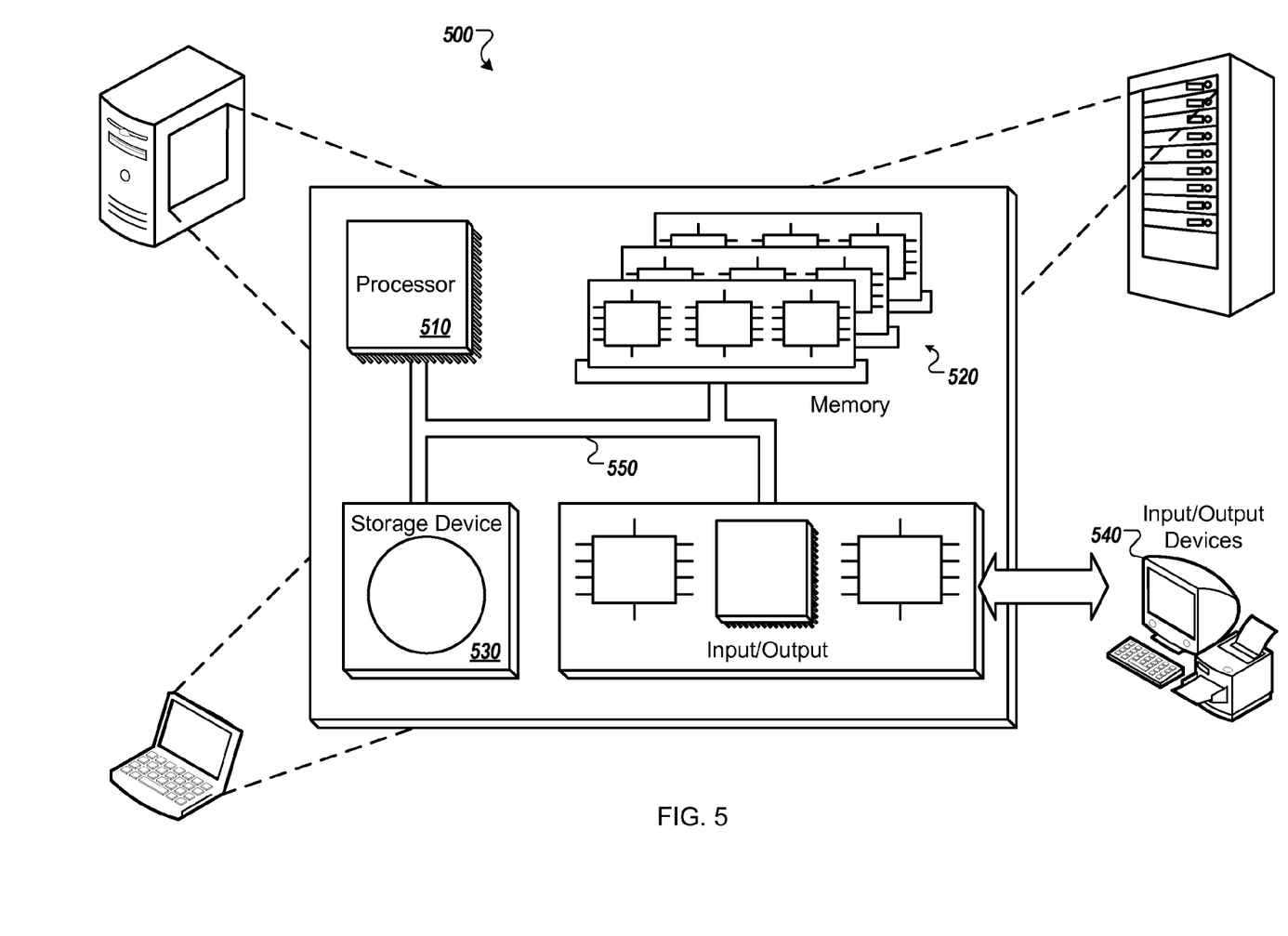
FIG. 5 is a block diagram of a computing system that can be used in connection with computer-implemented methods described in this document.

FIG. 5 is a schematic diagram of a generic computer system 500. The system 500 can be used for the operations described in association with any of the computer-implement methods described previously, according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. The memory 520 is a volatile memory unit in some implementations and is a non-volatile memory unit in other implementations.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method for processing stereo images, the method comprising:
   receiving a video sequence associated with a recorded setting of a stereoscopic camera, the recorded setting including a desired setting of the stereoscopic camera, the video sequence comprising pairs of left and right images;
   determining, by a computer, a corresponding actual setting of the stereoscopic camera, the corresponding actual setting including an actual setting of the stereoscopic camera while the video sequence is captured, wherein the corresponding actual setting is determined using a virtual three-dimensional (3D) space and a virtual camera rig in the virtual 3D space; and
   processing the pairs of left and right images by the computer to detect and reduce an influence of a discrepancy between the recorded setting of the stereoscopic camera and the corresponding actual setting of the stereoscopic camera, wherein the discrepancy is detected by the computer using the virtual 3D space and the virtual camera rig in the virtual 3D space.

2. The computer-implemented method of claim 1, further comprising:
   including the left and right images in the virtual 3D space; and
   generating the virtual camera rig in the virtual 3D space corresponding to the recorded setting of the stereoscopic camera; and
   wherein the processing of the pairs of left and right images further comprises determining a virtual setting of the virtual camera rig based on the pairs of left and right images, and generating modified pairs of left and right images using the virtual camera rig.

3. The computer-implemented method of claim 1, wherein the recorded setting of the stereoscopic camera includes values for the stereoscopic camera including at least one of: an interocular distance, a convergence distance, a focus distance, and left and right focal lengths.

4. The computer-implemented method of claim 3, further comprising smoothing at least one of the values to reduce quantization artifacts originating from analog-to-digital conversion.

5. The computer-implemented method of claim 1, further comprising adjusting the stereoscopic camera according to the processing.

6. The computer-implemented method of claim 2, further comprising:
adjusting the virtual setting of the virtual camera rig; and
generating a modified video sequence using the virtual camera rig with the adjusted virtual setting.

7. The computer-implemented method of claim 6, further comprising outputting the modified video sequence to a display device.

8. The computer-implemented method of claim 2, further comprising:
generating at least one additional virtual camera rig in the virtual 3D space;
optimizing a first value of a virtual setting of a first virtual camera rig;
optimizing a second value of a virtual setting of a second virtual camera rig, wherein the second value is different from the first value.

9. The computer-implemented method of claim 8, further comprising:
evaluating the first and second virtual camera rigs with regard to fit; and
selecting the virtual camera rig based on the evaluation.

10. A system comprising:
one or more processors;
memory communicatively linked with the one or more processors comprising code that when executed by the one or more processors causes the one or more processors to:
receive a video sequence associated with a recorded setting of a stereoscopic camera, the recorded setting including a desired setting of the stereoscopic camera, the video sequence comprising pairs of left and right images;
determine a corresponding actual setting of the stereoscopic camera, the corresponding actual setting including an actual setting of the stereoscopic camera while the video sequence is captured, wherein the corresponding actual setting is determined using a virtual three-dimensional (3D) space and a virtual camera rig in the virtual 3D space; and
process the pairs of left and right images to detect and reduce an influence of a discrepancy between the recorded setting of the stereoscopic camera and the corresponding actual setting of the stereoscopic camera, wherein the discrepancy is detected using the virtual 3D space and the virtual camera rig.

11. The system of claim 10, wherein the code causes the one or more processors to:
include the left and right images in the virtual 3D space; and
generate the virtual camera rig in the virtual 3D space corresponding to the recorded setting of the stereoscopic camera; and
wherein the processing of the pairs of left and right images further comprises determining a virtual setting of the virtual camera rig based on the pairs of left and right images, and generating modified pairs of left and right images using the virtual camera rig.

12. The system of claim 10, wherein the recorded setting of the stereoscopic camera includes values for the stereoscopic camera including at least one of: an interocular distance, a convergence distance, a focus distance, and left and right focal lengths.

13. The system of claim 12, wherein at least one of the values is smoothed to reduce quantization artifacts originating from analog to digital conversion.

14. The system of claim 12, wherein the code causes the one or more processors to transmit a signal to the stereoscopic camera to adjust a value of the recorded setting.

15. The system of claim 11, wherein the code causes the one or more processors to:
adjust at least one value of the virtual setting of the virtual camera rig; and
generate a modified video sequence using the virtual camera rig with the adjusted virtual setting.

16. The system of claim 15, wherein the modified video sequence is output to a display device.

17. The system of claim 12, wherein the code causes the one or more processors to:
generate at least one additional virtual camera rig in the virtual 3D space;
optimize a first value of a virtual setting of a first virtual camera rig;
optimize a second value of a virtual setting of a second virtual camera rig, wherein the second value is different from the first value.

18. The system of claim 17, further comprising code that when executed by the one or more processors causes the one or more processors to:
evaluate the first and second virtual camera rigs with regard to fit; and
select the virtual camera rig based on the evaluation.

19. A computer-program product tangibly embodied in a non-transitory computer-readable medium and comprising instructions that when executed by a processor perform a method comprising:
receiving a video sequence associated with a recorded setting of a stereoscopic camera, the recorded setting including a desired setting of the stereoscopic camera, the video sequence comprising pairs of left and right images;
determining a corresponding actual setting of the stereoscopic camera, the corresponding actual setting including an actual setting of the stereoscopic camera while the video sequence is captured, wherein the corresponding actual setting is determined using a virtual three-dimensional (3D) space and a virtual camera rig in the virtual 3D space; and
processing the pairs of left and right images to detect and reduce an influence of a discrepancy between the recorded setting of the stereoscopic camera and the corresponding actual setting of the stereoscopic camera, wherein the discrepancy is detected by the computer using the virtual 3D space and the virtual camera rig in the virtual 3D space.

20. The computer-program product of claim 19, wherein the performed method further comprises:
including the left and right images in the virtual 3D space;
generating the virtual camera rig in the virtual 3D space corresponding to the recorded setting of the stereoscopic camera; and
wherein the processing of the pairs of left and right images further comprises determining a virtual setting of the virtual camera rig based on the pairs of left and right images and generating modified pairs of left and right images using the virtual camera rig; and
adjusting the stereoscopic camera according to the processing.

* * * * *